March 15, 1960  S. T. DEAKIN  2,928,134
MANUFACTURE OF SYNTHETIC PLASTIC MATERIAL
Filed Jan. 17, 1955
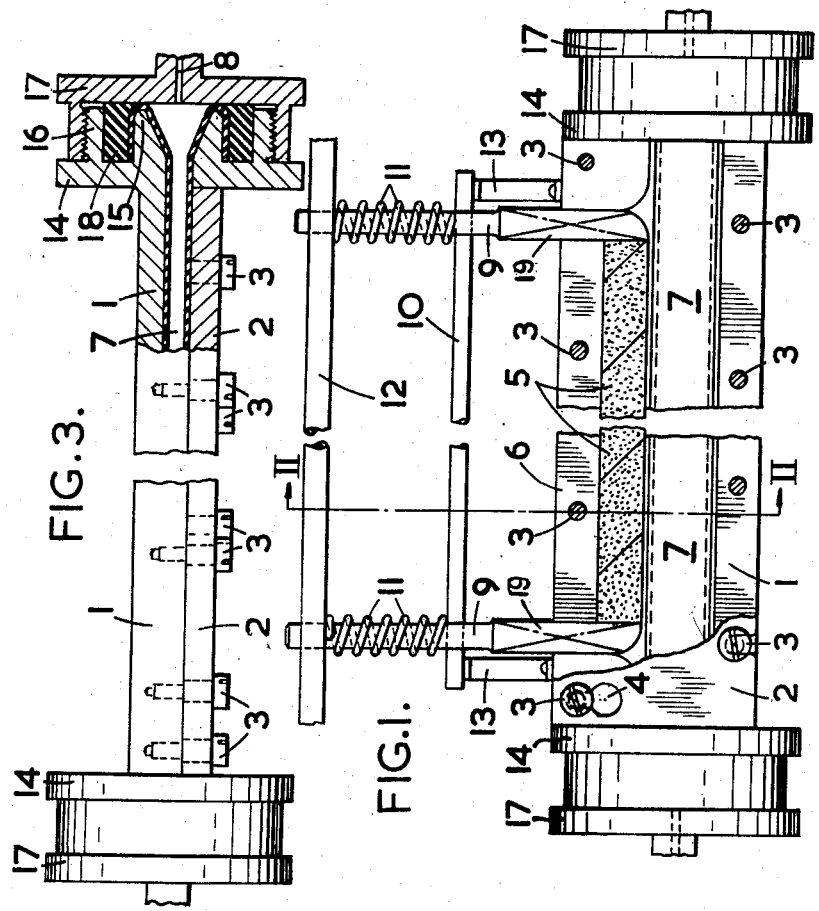

United States Patent Office 2,928,134
Patented Mar. 15, 1960

2,928,134

MANUFACTURE OF SYNTHETIC PLASTIC MATERIAL

Stanley Thomas Deakin, Ewell West, England, assignor, by mesne assignments, to Siemens Edison Swan Limited, Westminster, London, England, a British company Application January 17, 1955, Serial No. 482,264

Claims priority, application Great Britain January 25, 1954

2 Claims. (Cl. 18—55)

This invention relates to the manufacture of lengths of synthetic plastic material.

The invention has an important application in the manufacture of lengths of polytetrafluorethylene, hereinafter referred to as P.T.F.E.

In the case of materials such as P.T.F.E., which have the property of withstanding temperatures which are comparatively high for synthetic plastics, normal moulding processes are impracticable, particularly in cases of repetition manufacture.

According to the present invention, a method of manufacturing lengths of synthetic plastic material comprises the steps of placing the material in loose form within or in a mould member, applying fluid pressure through an intervening flexible layer over substantially one face of said plastic material to mould it to the desired shape, and thereafter subjecting the formed material to a moulding temperature.

Further according to the present invention, a process of manufacturing lengths of synthetic plastic material consists in compressing quantities of the material in a loose form to pre-form units capable of being handled, placing the units end to end in a trough member having closed ends and applying fluid pressure through an intervening flexible layer along the length of the plastic material in the trough so as to effect adhesion between the abutting ends of the units and thereafter removing the length of material from the trough and applying a moulding temperature.

It will be appreciated that the advantage of applying pressure by means of a fluid in a flexible container is that such pressure is applied uniformly to all parts of the plastic material no matter what the shape of the mould. The method ensures that articles so moulded are substantially homogeneous, an important consideration when using polytetrafluoroethylene which has a tendency to clog and resist the action of a normal mould ram.

The term "moulding temperature" implies a temperature at which the particles congeal into a solid mass and includes cases in which the particles merely sinter together and do not actually melt.

The units may be in the form of blocks, in which case the blocks may have sloping or chamfered ends so that the lateral pressure will press together the ends of the block the more effectively.

The invention is especially applicable to the manufacture of straight lengths of P.T.F.E. which are of rectangular cross-section, but is not limited in this respect and other cross-section shapes may be formed by employing suitably shaped channels. Moreover, the lengths may be curved or may comprise joints, e.g. elbows or T joints. An important application is to the manufacture of lengths of sheet material e.g. for the manufacture of tapes and the like.

It will be appreciated that lengths of material so formed may be coated with a metallic coating for instance so as to form dielectric waveguides. The metal coating may be applied to the length of plastic material before or after compression in the channel and prior to applying the moulding temperature. It may, for instance, be applied by a spraying process, and after such spraying further compression may if desired be applied to the plastic material so as to cause the metal to key into the surface of the plastic material.

A metallic coating so formed may serve as a base for further coatings of the same or similar metals which may be applied, for instance, by soldering or electro-plating provided of course that the temperatures reached in such operations do not reach those which, if applied to the plastic material, would cause fusion or permanent deformation.

Lengths of metal coated sheet material may be attached to a base by a suitable adhesive to form an anti-friction surface or protective surface on e.g. chutes, skis and the like.

In order that the invention may be more clearly understood, reference will now be made to the accompanying drawing, in which:

Fig. 1 is a plan view of a press for forming the lengths of plastic material prior to moulding;

Fig. 2 is a vertical section on the line II—II of Fig. 1; and

Fig. 3 is a side elevation of the arrangement shown in Fig. 1 but with part of the cover broken away.

In the drawing, the reference 1 indicates the main body of the trough member, and this is formed with a detachable cover plate 2 which is secured by studs 3 having enlarged heads and passing through key hole apertures 4 in the cover. The P.T.F.E. blocks are indicated by the reference 5. Lateral pressure is applied to the P.T.F.E. so as to compress it by means of an expanding rubber tube 7, against the wall 6. Fluid pressure is applied to the interior of the tube 7 through an inlet duct 8 as shown more clearly in Fig. 3.

In operation the cover 2 is removed and the blocks 5 are placed in the trough, the cover is then replaced, and then pressure is applied to the interior of the rubber tube 7 so as to exert lateral pressure on the P.T.F.E. units and compress them to the required cross-sectional shape.

As the pressure is applied to the blocks 5' compression takes place, correspondingly the square end bars 19 which extend across the ends of the P.T.F.E. as shown in Fig. 1, are pressed outwards thus ensuring that the ends of the P.T.F.E. remain square as the reducing of cross-sectional area of P.T.F.E. takes place. The upper ends 9 of the bars 19 are rounded and a cross-bar 10 extending longitudinally of the apparatus passes diametrically through and is affixed to the rods 9. Springs 11 are interposed between the cross-bar 10 and a fixed cross-bar 12 and give a spring return action on the square end bars 19.

Normally the springs 11 press the cross-bar against stops 13 which limit the inward movement of the square end bars 19. Stops 13 may be adjustable permitting variable-sized cross sections and also prevent bars 19 from damaging the rubber tube 7 by the sharp inside corners on the bars 19.

The sealing arrangement for the ends of the tube is shown more clearly in Fig. 3 and it will be observed that the end of the trough member is formed with a lateral plate member 14 from which concentric annular flanges 15 and 16 project axially. The inner flange 15 is chamfered and the end of the rubber tube 7 is bent back around it. The exterior of the outer flange 16 is screw-threaded and is engaged by a flange of a cover member 17. Between the two flanges is located an annular rubber bung 18 and when the cover 17 is screwed home the bung 18 is compressed and forms a seal. As is shown in Fig. 3, the duct 8 is formed in the cover 17 to provide for the admission of pressure fluid to the interior of the rubber tube 7.

It will be appreciated that in the case of a thin strip, the dimensions of the trough may be modified, i.e. the width shown vertically in Fig. 1 could be reduced and the height appreciably increased. (In Fig. 2 this would entail increasing the horizontal dimension and reducing the vertical dimension.) In such a case the pressure member 7 would press over the flat surface. Such an arrangement would be employed in manufacturing sheet or strip coatings for chutes, skis, and the like. In such cases, the coating would be metallised and then secured to a backing e.g. a wood ski, by an adhesive applied to the metallised surface. The adhesive used may be a synthetic resin e.g. araldite. In the case of a metal backing, soldering or like processes may be employed.

What I claim is:

1. A method of manufacturing lengths of synthetic plastic material comprising the steps of cold compressing quantities of the material in a loose form into pre-formed semi-compacted units capable of being handled; placing the units end to end in a trough member having closed ends, further cold-compressing the units by applying a uniform fluid pressure through an intervening flexible layer along the length of the plastic material in the trough so as to effect adhesion between abutting ends of the units, and removing the composite formed length of material from the trough and subjecting it to a moulding temperature.

2. A method of manufacturing lengths of polytetrafluoroethylene comprising the steps of cold compressing quantities of polytetrafluoroethylene in a loose form into pre-formed semi-compacted units capable of being handled, chamfering the ends of said pre-formed units whereby to effect better adhesion between said units, placing the units end to end in a trough member having closed ends, further cold-compressing the units by applying a uniform fluid pressure through an intervening flexible layer along the length of the polytetrafluoroethylene in the trough so as to effect adhesion between the chamfered ends of the units, and removing the composite formed length of polytetrafluoroethylene from the trough and subjecting it to a sintering temperature.

References Cited in the file of this patent

UNITED STATES PATENTS

| | | |
|---|---|---|
| 1,226,470 | Coolidge | May 15, 1917 |
| 1,305,975 | Pfanstiehl | June 3, 1919 |
| 1,547,399 | Kaufmann et al. | July 28, 1925 |
| 1,884,528 | Benner et al. | Oct. 25, 1932 |
| 2,264,535 | Klemm | Dec. 2, 1939 |
| 2,351,713 | Sayre | June 20, 1944 |
| 2,447,434 | Schwarzkopf | Aug. 17, 1948 |
| 2,470,227 | Wheeler | May 17, 1949 |
| 2,710,991 | Squires et al. | June 21, 1955 |